United States Patent
Kitazato

(10) Patent No.: US 8,327,400 B2
(45) Date of Patent: Dec. 4, 2012

(54) RECEIVING APPARATUS, RECEIVING METHOD, AND PROGRAM

(75) Inventor: Naohisa Kitazato, Tokyo (JP)

(73) Assignee: Sony Corporation, Tokyo (JP)

( * ) Notice: Subject to any disclaimer, the term of this patent is extended or adjusted under 35 U.S.C. 154(b) by 456 days.

(21) Appl. No.: 12/627,368

(22) Filed: Nov. 30, 2009

(65) Prior Publication Data

US 2010/0162323 A1    Jun. 24, 2010

(30) Foreign Application Priority Data

Dec. 18, 2008  (JP) ................................ 2008-322452

(51) Int. Cl.
*H04N 5/445* (2011.01)
*G01S 13/00* (2006.01)
*G06F 3/00* (2006.01)
*G06F 13/00* (2006.01)

(52) U.S. Cl. ................ 725/38; 725/48; 725/50; 701/25; 701/36; 701/516

(58) Field of Classification Search ..................... 725/38, 725/48, 50; 701/25, 36, 516
See application file for complete search history.

(56) References Cited

U.S. PATENT DOCUMENTS

| 5,990,928 | A * | 11/1999 | Sklar et al. | ........................ 725/72 |
| 2006/0181652 | A1 | 8/2006 | Hagiwara | |
| 2008/0165831 | A1 | 7/2008 | Chu et al. | |

FOREIGN PATENT DOCUMENTS

| EP | 1 919 246 A1 | 5/2008 |
| JP | 7-284030 | 10/1995 |
| JP | 2006-13765 A | 1/2006 |
| JP | 2006-67270 A | 3/2006 |
| JP | 2007-150856 A | 6/2007 |

OTHER PUBLICATIONS

Japanese Office Action issued Sep. 28, 2010 in corresponding Japanese Application No. 2008-322452.

* cited by examiner

*Primary Examiner* — Dominic D Saltarelli
(74) *Attorney, Agent, or Firm* — Oblon, Spivak, McClelland, Maier & Neustadt, L.L.P.

(57) ABSTRACT

A receiving apparatus includes: a receiving section receiving a broadcast signal of a selected channel; a holding section holding, for each community, a broadcast channel list indicating one or more channels broadcast in the community and a representative channel of those channels, and an adjacent community list indicating adjacent communities adjacent to the community with an overlapping area; a specifying section specifying the community; an overlap list creating section creating an overlap list listing the community that is specified and its adjacent communities; a channel selection section selecting a channel received by the receiving section, and determining success/failure of reception of the broadcast signal of the selected channel; and a receive channel list creating section creating a receive channel list indicating receivable channels, on the basis of determination result of success/failure of reception of the broadcast signal of each channel broadcast in the communities listed in the overlap list.

11 Claims, 11 Drawing Sheets

| BROADCAST CHANNEL LIST | | |
|---|---|---|
| COMMUNITY | ASSIGNED STATION | REPRESENTATIVE STATION INFORMATION |
| COMMUNITY C1 | STATION ST1 CH8 | 1 |
| | STATION ST2 CH23 | 0 |
| | STATION ST3 CH29 | 0 |
| | STATION ST4 CH35 | 0 |
| | STATION ST5 CH42 | 0 |
| COMMUNITY C2 | STATION ST6 CH18 | 0 |
| | STATION ST7 CH27 | 1 |
| | STATION ST8 CH38 | 0 |
| COMMUNITY C3 | STATION ST9 CH33 | 1 |
| | STATION ST10 CH44 | 0 |
| | STATION ST11 CH51 | 0 |
| COMMUNITY C4 | STATION ST12 CH4 | 1 |
| COMMUNITY C5 | STATION ST13 CH16 | 1 |
| COMMUNITY C6 | STATION ST14 CH25 | 0 |
| | STATION ST15 CH32 | 1 |
| COMMUNITY C7 | STATION ST16 CH39 | 1 |

| ADJACENT COMMUNITY LIST ||
|---|---|
| COMMUNITY | ADJACENT COMMUNITY |
| COMMUNITY C1 | COMMUNITY C3 |
| | COMMUNITY C2 |
| | COMMUNITY C4 |
| | COMMUNITY C5 |
| | COMMUNITY C6 |
| COMMUNITY C2 | COMMUNITY C1 |
| | COMMUNITY C5 |
| | COMMUNITY C3 |
| | COMMUNITY C10 |
| COMMUNITY C3 | COMMUNITY C1 |
| | COMMUNITY C4 |
| | COMMUNITY C2 |
| | COMMUNITY C8 |
| COMMUNITY C4 | COMMUNITY C1 |
| | COMMUNITY C3 |
| | COMMUNITY C9 |
| COMMUNITY C5 | COMMUNITY C2 |
| | COMMUNITY C1 |
| | COMMUNITY C6 |
| | COMMUNITY C7 |
| COMMUNITY C6 | COMMUNITY C5 |
| | COMMUNITY C7 |
| | COMMUNITY C1 |
| COMMUNITY C7 | COMMUNITY C6 |
| | COMMUNITY C5 |
| | COMMUNITY C11 |

RECEIVING APPARATUS, RECEIVING METHOD, AND PROGRAM

BACKGROUND OF THE INVENTION

1. Field of the Invention

The present invention relates to a receiving apparatus, a receiving method, and a program, in particular, for example, a receiving apparatus, a receiving method, and a program which are suitable for use in the case of receiving terrestrial digital broadcasting in the United States.

2. Description of the Related Art

In television broadcasting, channels (frequencies) for broadcast signals vary by region. Therefore, a channel that is receivable in a given region may not be receivable in another region in some cases.

On the other hand, for example, in the case of compact, lightweight portable television receivers that are mounted in an automobile or carried by the user, it is highly likely that the location of their use, that is, the location of reception is changed frequently.

Some of portable television receivers have a function of acquiring positional information on the current location, and holds receive channel lists corresponding to individual reception regions in advance, identify a reception region to which the current location indicated by the acquired positional information belongs, and acquires a receive channel list corresponding to the identified reception region. In this regard, a receive channel list is a list describing only channels that are receivable in a corresponding reception region. The receive channel list is used in the case of, for example, switching channels only between channels included in the receive channel list, in response to a channel up/down operation made from the user.

As a function for acquiring positional information on the current location, for example, there is a method of using a GPS (Global Positioning System), or a method of exploiting positional information obtained by a navigation system (see, for example, Japanese Unexamined Patent Application Publication No. 7-284030).

As described above, the method of acquiring a receive channel list corresponding to the current location is effective in the case of, for example, receiving terrestrial digital broadcasting in Japan. This is because in the case of terrestrial digital broadcasting in Japan, normally, reception regions are set on a prefecture-by-prefecture basis, and a reception region can be uniquely identified on the basis of acquired position information on the current location.

However, the above-described method is not necessarily appropriate in the case of receiving terrestrial digital broadcasting in the United States. This is because in the case of terrestrial digital broadcasting in the United States, there is no reference (for example, the prefecture-by-prefecture basis in Japan) as to how to set reception regions, and hence it is not possible to uniquely identify a reception region from acquired positional information on the current location, and moreover, there is an overlap in reception region.

Now, a description will be given of terrestrial digital broadcasting in the United States.

FIG. 1 shows frequency bands used for terrestrial digital broadcasting in the United States. That is, a broadcast is transmitted by using the VHF band from CH(channel) 2 to CH13, and is transmitted by using UHF from CH14 to CH51.

As described above, when receiving terrestrial digital broadcasting in the United States, it is not possible to acquire a receive channel list in accordance with the current location. Accordingly, for example, as shown in FIG. 2, it is necessary to select all channels from CH2 to CH51 sequentially to determine success/failure of reception (hereinafter, referred to as all-channel scan), and create a receive channel list on the basis of the determination results. Since this all-channel scan determines success/failure of reception on each channel, it takes quite a long time to finish the all-channel scan, forcing inconvenience on the user.

FIG. 3 shows an example of a community equivalent to the above-described reception region in the United States. One or more broadcasting stations (hereinafter, also referred to as stations) belong to the community. However, this does not mean that broadcast signals from all the broadcasting stations belonging to the community can be received throughout the entire area of the community.

That is, of all the broadcasting stations belonging to the community, the coverage area of a broadcasting station with the largest coverage area (receivable range) coincides with the range of the community. The coverage area of each broadcasting station is not necessarily circular or elliptical, but may have directivity with respect to a predetermined direction in some cases.

For example, three stations, A, B, and C, belong to a community C1, of which the station A with the largest coverage area serves as a representative station. The coverage area of the station B is smaller than that of the station A. The coverage area of the station C has directivity.

SUMMARY OF THE INVENTION

FIG. 4 shows an example of arrangement of communities for terrestrial digital broadcasting in the United States. As shown in the figure, each community overlaps other communities in some cases. Therefore, for example, when a television broadcast is received at the position where three communities C1, C2, and C3 overlap in FIG. 4, there is a possibility that broadcast signals from stations belonging to each of the communities C1, C2, and C3 can be received.

Therefore, if it is uniquely identified from positional information on the current location that the current location belongs to the community C1, there is a possibility that even though it is possible to receive broadcast signals from the stations in the communities C2 and C3, it is not possible to make effective use of these signals (broadcast signals from the communities C2 and C3).

It is desirable to make it possible to determine receivable channels at the current location as quickly as possible in cases when it is not possible to uniquely identify the community to which the current location belongs, as in the case of, for example, terrestrial digital broadcasting in the United States.

A receiving apparatus according to an embodiment of the present invention includes: receiving means for receiving a broadcast signal of a selected channel; holding means for holding a broadcast channel list and an adjacent community list for each of communities indicating a range in which the broadcast signal of each of one or more channels is receivable, the broadcast channel list recording information indicating the one or more channels that are broadcast in each of the communities and a representative channel of the one or more channels, the adjacent community list indicating adjacent communities adjacent to each of the communities with an overlapping area; specifying means for specifying each of the communities; overlap list creating means for creating an overlap list that lists up each of the communities which is specified, and adjacent communities adjacent to each of the specified communities; channel selection means for selecting a channel to be received by the receiving means, and determining success/failure of reception of the broadcast signal of the selected channel; and receive channel list creating means for creating a receive channel list indicating receivable channels, on the basis of a determination result of success/failure of reception of the broadcast signal of each of channels broadcast in the communities listed up in the overlap list.

The representative channel may be a channel with the largest receivable range within each of the communities.

The overlap list creating means may further delete, from the overlap list, each of the adjacent communities for which the broadcast signal of the representative channel is not receivable.

The adjacent community list may describe the adjacent communities in decreasing order of the overlapping area with respect to each of the communities.

The specifying means may specify each of the communities in response to a user's selecting operation.

A receiving apparatus according to an embodiment of the present invention may further include initial search list creating means for creating an initial search list by listing up at least one of: a channel of which the broadcast signal was receivable immediately previously; a channel of which the broadcast signal was received immediately previously; the representative channel of each of the communities with a high frequency of reception in the past; channels with a high frequency of reception in the past; and channels with a high assign rate in all of the communities.

The specifying means may specify each of the communities corresponding to each of the channels listed up in the initial search list.

The specifying means may specify each of the communities on the basis of community identification information contained in the broadcast signal of each of the channels listed up in the initial search list.

The overlap list creating means may further delete, from the overlap list, adjacent communities other than adjacent communities that are also adjacent communities for each of the adjacent communities for which the broadcast signal of the representative channel has been successfully received.

A receiving method according to an embodiment of the present invention is a receiving method for a receiving apparatus, the receiving apparatus including receiving means for receiving a broadcast signal of a selected channel, and holding means for holding a broadcast channel list and an adjacent community list for each of communities indicating a range in which the broadcast signal of each of one or more channels is receivable, the broadcast channel list recording information indicating the one or more channels that are broadcast in each of the communities and a representative channel of the one or more channels, the adjacent community list indicating adjacent communities adjacent to each of the communities with an overlapping area, the receiving method including the steps of the receiving apparatus: specifying each of the communities; creating an overlap list that lists up each of the communities which is specified, and adjacent communities adjacent to each of the specified communities; selecting a channel to be received by the receiving means, and determining success/failure of reception of the broadcast signal of the selected channel; and creating a receive channel list indicating receivable channels, on the basis of a determination result of success/failure of reception of the broadcast signal of each of channels broadcast in the communities listed up in the overlap list.

A program according to an embodiment of the present invention is a program for controlling a receiving apparatus, the receiving apparatus including receiving means for receiving a broadcast signal of a selected channel, and holding means for holding a broadcast channel list and an adjacent community list for each of communities indicating a range in which the broadcast signal of each of one or more channels is receivable, the broadcast channel list recording information indicating the one or more channels that are broadcast in each of the communities and a representative channel of the one or more channels, the adjacent community list indicating adjacent communities adjacent to each of the communities with an overlapping area, the program causing a computer of the receiving apparatus to execute processing including the steps of: specifying each of the communities; creating an overlap list that lists up each of the communities which is specified, and adjacent communities adjacent to each of the specified communities; selecting a channel to be received by the receiving means, and determining success/failure of reception of the broadcast signal of the selected channel; and creating a receive channel list indicating receivable channels, on the basis of a determination result of success/failure of reception of the broadcast signal of each of channels broadcast in the communities listed up in the overlap list.

According to an embodiment of the present invention, a community is specified, an overlap list that lists up the specified community and adjacent communities adjacent to the specified community is created, and a receive channel list indicating receivable channels is created on the basis of the determination result on success/failure of reception of the broadcasting signal of each of channels broadcast in the communities listed up in the overlap list.

BRIEF DESCRIPTION OF THE DRAWINGS

FIG. 6 is a diagram showing an example of a broadcast channel list;

FIG. 7 is a diagram showing an example of an adjacent community list;

DESCRIPTION OF THE PREFERRED EMBODIMENTS

Hereinbelow, the best modes for carrying out the present invention (hereinafter, referred to as embodiments) will be described in detail with reference to the drawings. The description will be given in the following order of topics.

1. First Embodiment

1. First Embodiment
[Configuration Example of Portable Television Receiver]

Figure 5:
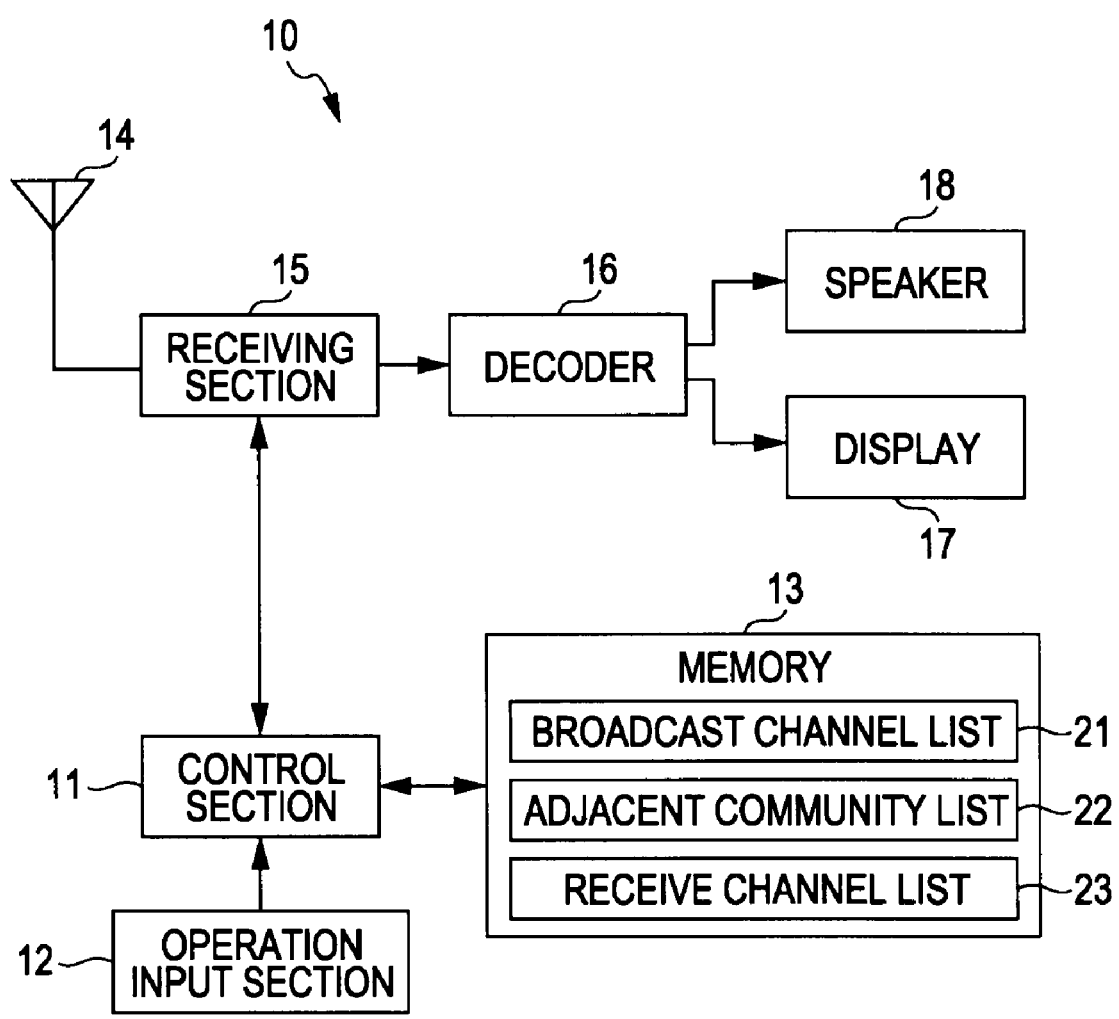
FIG. 5 is a block diagram showing a configuration example of a portable television receiver to which an embodiment of the present invention is applied.

FIG. 5 shows a configuration example of a portable television receiver according to an embodiment of the present invention. For a portable television receiver 10 in this case, the case of receiving and viewing terrestrial digital broadcasting in the United States is assumed.

The portable television receiver 10 includes a control section 11, an operation input section 12, a memory 13, an antenna 14, a receiving section 15, a decoder 16, a display 17, and a speaker 18.

The control section 11 controls the portable television receiver 10 as a whole in accordance with an operation signal inputted from the operation input section 12. For example, the control section 11 performs channel selection control for specifying a channel received by the receiving section 15. In addition, for example, the control section 11 creates a receive channel list on the basis of reception success/failure information notified from the receiving section 15. A detailed configuration example of the control section 11 will be described later with reference to FIGS. 8 and 10.

The operation input section 12 accepts various operations from the user, and outputs corresponding operation signals to the control section 12. For example, the operation input section 12 makes the user select a community to which the current location is considered to belong, and outputs an operation signal containing information identifying the selected community to the control section 11.

The memory 13 is a non-volatile memory, and holds a broadcast channel list 21 and an adjacent community list 22 in advance. The latest updated broadcast channel 21 and community list 22 may be supplied to the portable television receiver 10 by some method to update the broadcast channel list 21 and the adjacent community list 22 that are held in the memory 13.

As a method of supplying the latest updated broadcast channel list 21 and adjacent community list 22 to the portable television receiver 10, for example, the latest updated broadcast channel list 21 and adjacent community list 22 may be supplied by using a broadcast signal, by using a network such as the Internet, or by using a recording medium.

The memory 13 also holds a receive channel list 23 created by the control section 11. The receive channel list 23 is used in the case of, for example, switching channels only between channels included in the receive channel list 23, in response to a channel up/down operation from the user.

The receiving section 15 determines success/failure of reception of a channel selected by the control section 11, and notifies the control section 11 of reception success/failure information indicating the determination result. In addition, the receiving section 15 also extracts, from among broadcast signals inputted via the antenna 14, the broadcast signal of the channel selected by the control section 11, and outputs the broadcast signal to the decoder 16.

The decoder 16 decodes one channel's worth of broadcast signal inputted from the receiving section 15, and outputs a video signal and an audio signal obtained as a result to the display 17 and the speaker 18. The display 17 displays a screen based on the video signal inputted from the decoder 16. The speaker 18 outputs audio based on the audio signal inputted from the decoder 16.

FIG. 6 shows an example of the broadcast channel list 21 that is held in the memory 13 in advance. The broadcast channel list 21 describes, for each community, one or more stations (broadcasting stations) belonging to the community and the corresponding channels (broadcasting frequencies), and representative station information indicating a representative station with the largest coverage area of the one or more stations. As the representative station information, for example, one bit may be assigned, with 1 written for the representative station, and 0 for other stations.

In the case of FIG. 6, for example, five stations, ST1, ST2, ST3, ST4, and ST5 belong to a community C1, and the broadcasting frequencies of the stations are respectively CH8, CH23, CH29, CH35, and CH42 in order. In addition, the representative station of the community C1 is the station ST1.

Also, for example, three stations, ST6, ST7, and ST8 belong to a community C2, and the broadcasting frequencies of the stations are respectively CH18, CH27, and CH38 in order. In addition, the representative station of the community C2 is the station ST7. The same applies to communities from a community C3 onwards.

Figure 1:
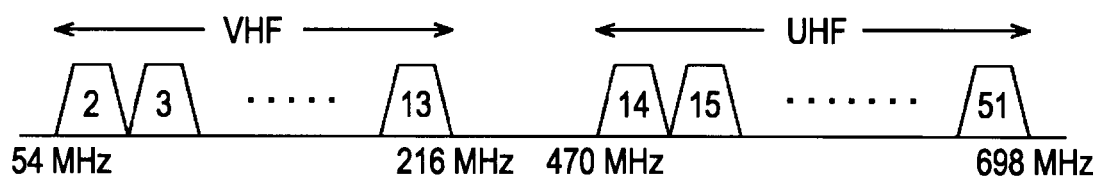
FIG. 1 is a diagram showing frequencies used for terrestrial digital broadcasting in the United States.
Figure 2:
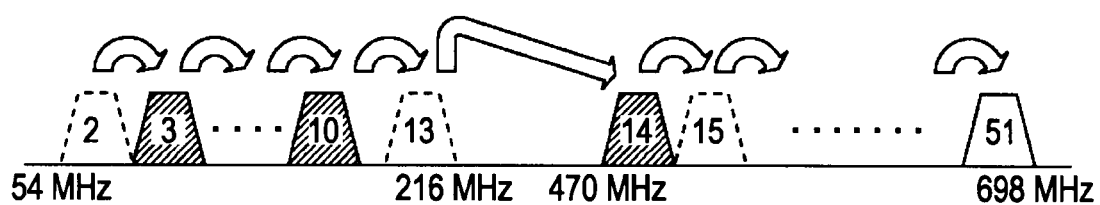
FIG. 2 is a diagram illustrating an all-channel scan.
Figure 3:
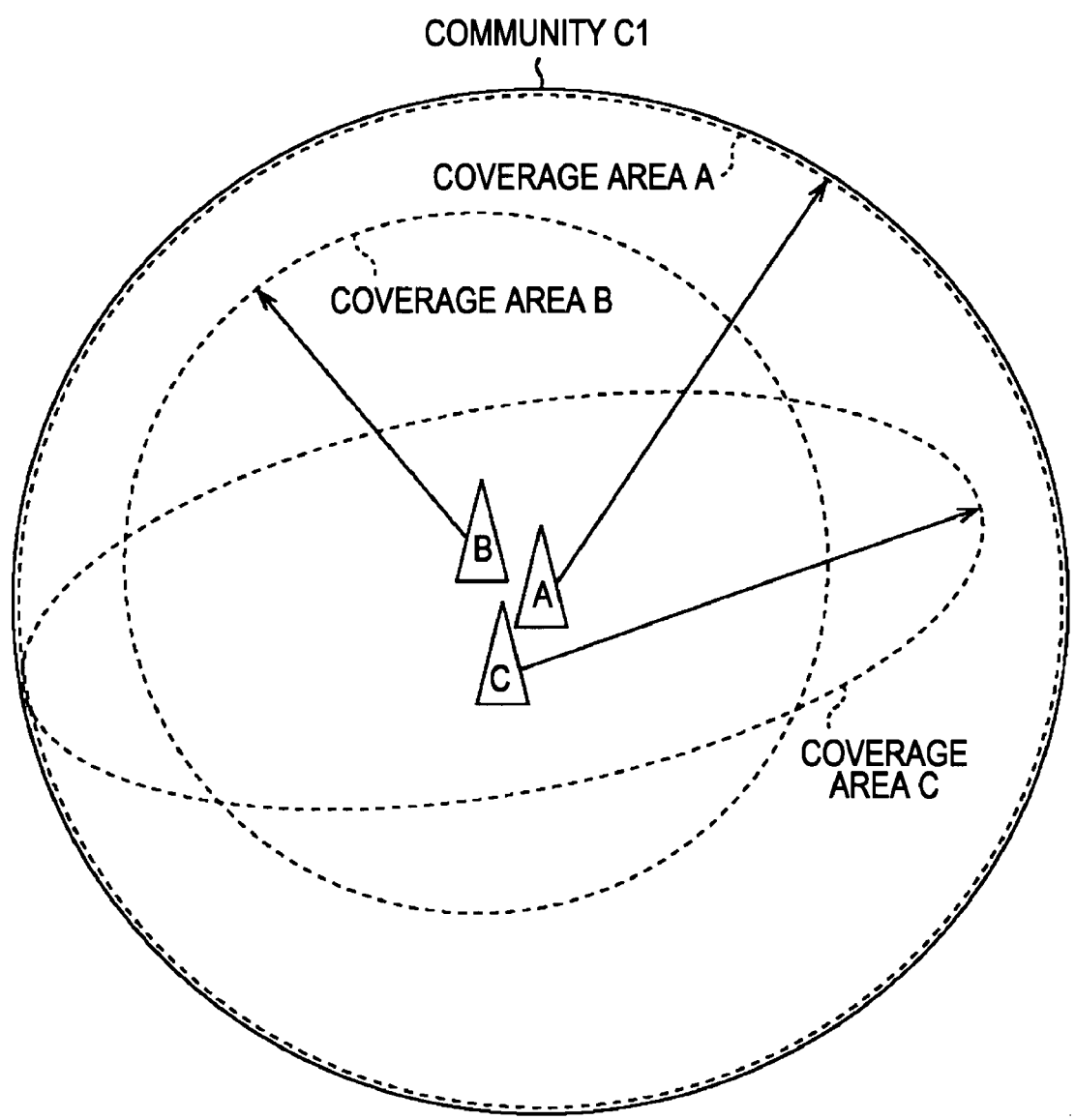
FIG. 3 is a diagram showing an example of a community in terrestrial digital broadcasting in the United States.
Figure 4:
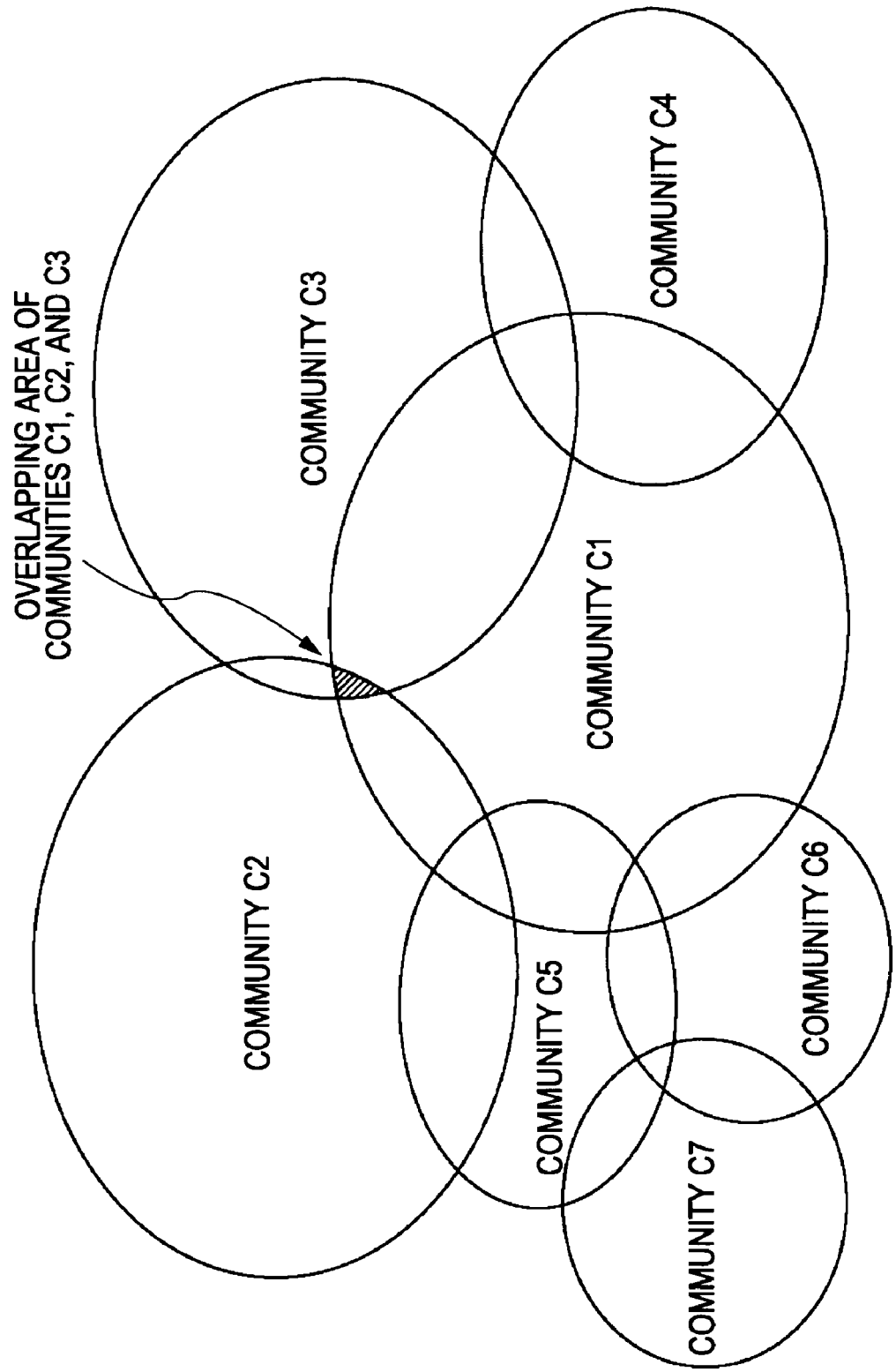
FIG. 4 is a diagram showing an example of arrangement of communities in terrestrial digital broadcasting in the United States.

FIG. 7 shows an example of the adjacent community list 22 that is held in the memory 13 in advance. The adjacent community list 22 in the figure corresponds to the arrangement example of communities shown in FIG. 4.

In the adjacent community list 22, for each community, adjacent communities having overlapping areas with the community are described in decreasing order of size of the overlapping area.

In the case of FIG. 7, for example, the communities C3, C2, C4, C5, and C6 have overlapping areas with the community C1. The size of the overlapping area with the community C3 is the largest, and the size of the overlapping area with the community C6 is the smallest.

Also, for example, the communities C1, C5, C3, and C10 have overlapping areas with the community C2. The size of the overlapping area with the community C1 is the largest, and the size of the overlapping area with the community C10 is the smallest. The same applies to communities from the community C3 onwards.

[First Configuration Example of Control Section 11]

Figure 8:
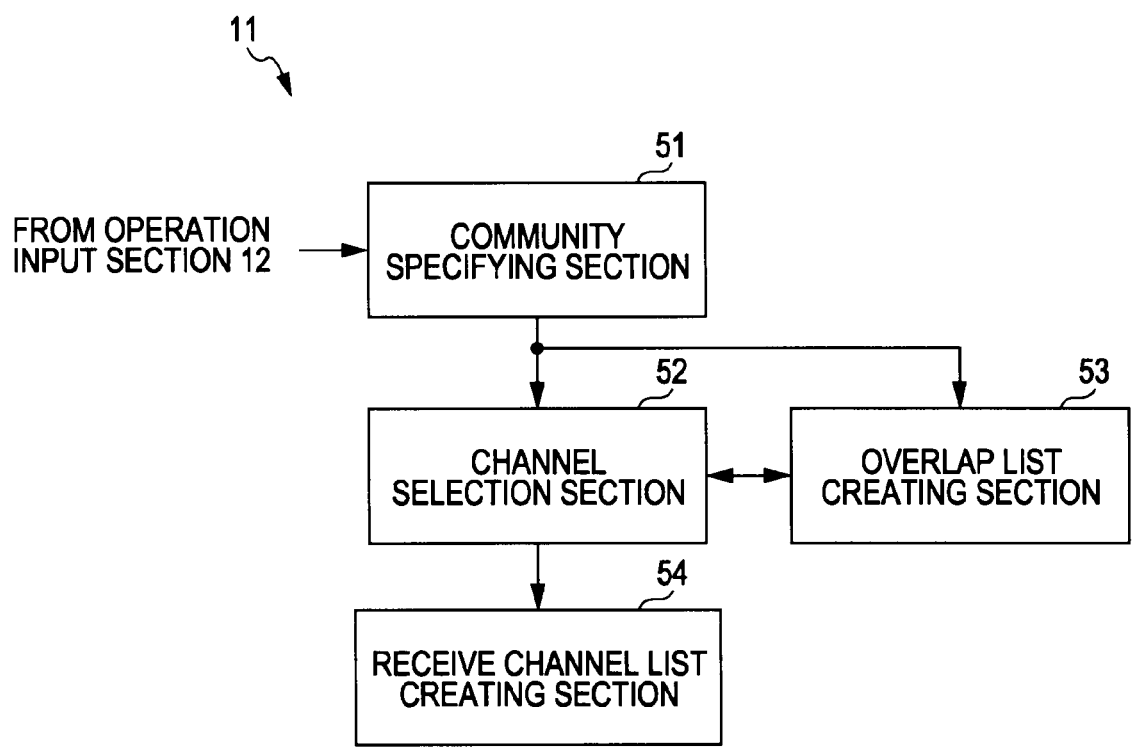
FIG. 8 is a block diagram showing a first configuration example of a control section in FIG. 5.

Next, FIG. 8 shows a first configuration example of the control section 11.

The control section 11 according to the first configuration example includes a community specifying section 51, a channel selection section 52, an overlap list creating section 53, and a receive channel list creating section 54.

The community specifying section 51 specifies a single community in accordance with a selecting operation from the user, and notifies the channel selection section 52 and the overlap list creating section 53 of the specified community, in the initial stage of a process of searching for and listing up receivable channels (hereinafter, referred to as receive channel list creating process). The user's selecting operation at this time is to select a community to which the user thinks the current location (the position of use (reception) of the portable television receiver 10) belongs.

The channel selection section 52 controls the receiving section 15 to select the channels of stations belonging to the specified community, by referring to the broadcast channel list 21 that is held in the memory 13. Also, the channel selection section 52 controls the receiving section 15 to select the channels of stations belonging to communities included in an overlap list (described later) created by the overlap list creating section 53. Further, the channel selection section 52 controls the overlap list creating section 53 or the receive channel list creating section 54 in accordance with the reception success/failure information (information indicating success/failure of reception of individual channels) that is notified from the receiving section 15 in accordance with channel selection control.

The overlap list creating section 53 creates an overlap list by referring to the adjacent community list 22 that is held in the memory 13, in accordance with control from the channel selection section 52. In this regard, an overlap list refers to a list of communities to which the current location can possibly belong in an overlapping manner, and includes the community specified by the community specifying section 51.

The receive channel list creating section 54 creates the receive channel list 23 and causes the receive channel list 23 to be held in the memory 13, in accordance with control from the channel selection section 52.

[Description of Operation According to First Configuration Example of Control Section 11]

Figure 9:
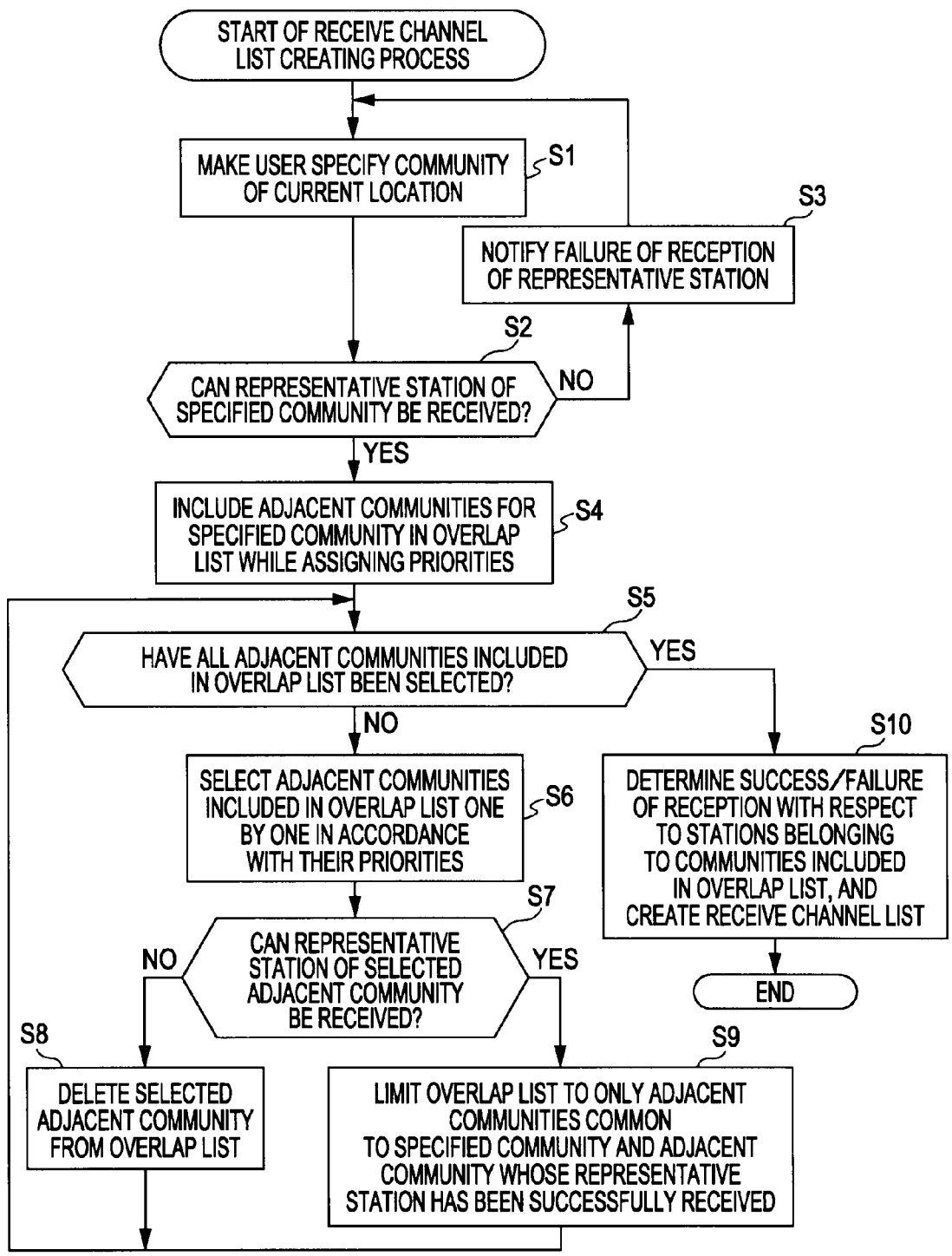
FIG. 9 is a flowchart illustrating a receive channel list creating process according to the first configuration example of the control section.

FIG. 9 is a flowchart illustrating a receive channel list creating process according to the first configuration example of the control section 11.

This receive channel list creating process is started in accordance with, for example, a start instruction from a user who thinks that he/she has moved the position of use (reception) of the portable television receiver 10 to such an extent that the community to which the current location belongs is changed. Alternatively, for example, a function of detecting the current location on the basis of a GPS signal may be provided so that the receive channel list creating process is started upon detecting that the position of use (reception) of the portable television receiver 10 has been moved to such an extent that the community to which the current location belongs is changed.

In step S1, the operation input section 12 makes the user select a community to which the current location is considered to belong, and outputs an operation signal containing information identifying the selected community to the community specifying section 51 of the control section 11. In response to this, the community specifying section 51 specifies a single community corresponding to the user's selection, and notifies the channel selection section 52 and the overlap list creating section 53 of the specified community.

In step S2, the channel selection section 52 controls the receiving section 15 to select a representative station from among the channels of stations belonging to the specified community, by referring to the broadcast channel list 21 that is held in the memory 13. In accordance with this control, the receiving section 15 determines success/failure of reception of the channel that the receiving section 15 is controlled to select by the channel selection section 52, and notifies the channel selection section 52 in the control section 11 of reception success/failure information indicating the determination result.

Further, on the basis of the reception success/failure information from the receiving section 15, the channel selection section 52 determines whether or not the representative station of the specified community has been successfully received. If it is determined that the representative station of the specified community has not been successfully received, the processing is advanced to step S3, where the user is notified of an indication that the representative station has not been successfully received, and of reselection of a community. Thereafter, the processing is returned to step S1, and the subsequent processing is repeated.

If it is determined in step S2 that the representative station of the specified community has been successfully received, the processing is advanced to step S4.

In step S4, in accordance with control of the channel selection section 52, the overlap list creating section 53 refers to the adjacent community list 22 held in the memory 13, and lists up adjacent communities each having an overlapping area with the specified community while assigning priorities in order of size of the overlapping area, thereby creating an overlap list. In this overlap list, the specified community is also included as being at the top level of the priorities.

In step S5, the channel selection section 52 determines whether or not all the adjacent communities included in the created overlap list have been selected, and if unselected adjacent communities remain, advances the processing to step S6.

In step S6, the channel selection section 52 selects, from among the adjacent communities included in the created overlap list, unselected adjacent communities one by one in accordance with their priorities. It should be noted, however, that since the community at the top level of the overlap list is the one selected in step S1, this community is regarded as having been already selected, and the community with the second highest priority and onwards are selected.

In step S7, the channel selection section 52 determines whether or not a representative station of each of the adjacent communities selected in step S6 can be received. Specifically, the channel selection section 52 controls the receiving section 15 to select a representative station from among the channels of stations belonging to the selected adjacent community, by referring to the broadcast channel list 21 that is held in the memory 13. In accordance with this control, the receiving section 15 determines success/failure of reception of the channel that the receiving section 15 is controlled to select by the channel selection section 52, and notifies the channel selection section 52 in the control section 11 of reception success/failure information indicating the determination result. Further, the channel selection section 52 determines whether or not the representative station of the selected adjacent community has been successfully received, on the basis of the reception success/failure information from the receiving section 15.

If it is determined in step S7 that the representative station of the selected adjacent community has not been successfully received, the processing is advanced to step S8. In step S8, in accordance with control from the channel selection section 52, the overlap list creating section 53 removes from the overlap list the adjacent community whose representative station has not been successfully received. Thereafter, the processing returns to step S5, and the subsequent processing is repeated.

Conversely, if it is determined in step S7 that the representative station of the selected adjacent community has been successfully received, the processing is advanced to step S9. In step S9, in accordance with control from the channel selection section 52, the overlap list creating section 53 refers to the adjacent community list 22 held in the memory 13, and leaves, among adjacent communities included in the overlap list, only those adjacent communities which are also adjacent communities for the adjacent community whose representative station has been successfully received, and removes the others from the overlap list. Thereafter, the processing returns to step S5, and the subsequent processing is repeated.

Thereafter, if it is determined in step S5 that no unselected adjacent community remains among the adjacent communities included in the created overlap list, the processing is advanced to step S10.

In step S10, the channel selection section 52 determines whether or not stations other than the representative stations of communities included in the current overlap list (that is, communities whose representative stations have been successfully received) can be received. Specifically, the channel selection section 52 controls the receiving section 15 to sequentially select the channels of stations belonging to each of the communities included in the current overlap list, by referring to the broadcast channel list 21 that is held in the memory 13. In accordance with this control, the receiving section 15 determines success/failure of reception of each channel that the receiving section 15 is controlled to select by the channel selection section 52, and notifies the channel selection section 52 in the control section 11 of reception success/failure information indicating the determination result. Further, on the basis of the reception success/failure information from the receiving section 15, the channel selection section 52 notifies the receive channel list creating section 54 of stations that have been successfully received and the corresponding channels.

In response to this notification, the receive channel list creating section 54 creates the receive channel list 23 that is a list of receivable channels at the current location, and causes the receive channel list 23 to be held in the memory 13. The above completes the receive channel list creating process.

[Second Configuration Example of Control Section 11]

Figure 10:
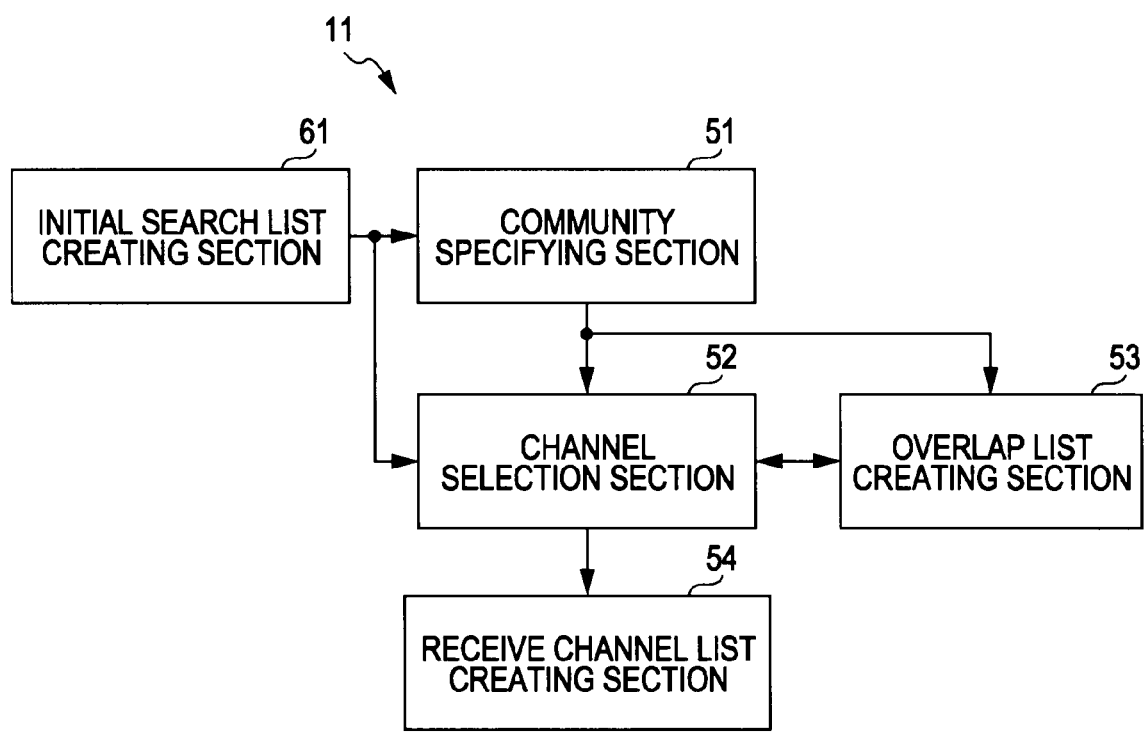
FIG. 10 is a block diagram showing a second configuration example of a control section in FIG. 5.

Next, FIG. 10 shows a second configuration example of the control section 11.

In the second configuration example of the control section 11, an initial search list creating section 61 is provided to the first configuration example shown in FIG. 8. Components other than the initial search list creating section 61 are the same as the components in the first configuration example shown in FIG. 8, and since those components are denoted by the same reference numerals, description thereof is omitted as appropriate.

As a precondition to realizing the second configuration example of the control section 11, it is assumed that a broadcast signal contains community identification information that enables identification of a community to which a station that has transmitted the broadcast signal belongs. In addition, it is assumed that the portable television receiver 10 holds a receive history for a predetermined period in the past.

The initial search list creating section 61 creates an initial search list that lists up channels that are highly likely to be receivable, as a process to be performed prior to specifying a single community in the initial stage of the receive channel list creating process.

When creating an initial search list, the following channels are listed up while being assigned priorities.

(1) Channels that were receivable on the immediately
  previous (time in the past closest to the timing of creating an initial search list this time) scan
(2) Channel that was viewed (received) immediately previously (time in the past closest to the timing of creating an initial search list this time)
(3) Predetermined number of channels of representative stations of communities listed in order from the one with the highest frequency of reception in the past
(4) Predetermined number of channels listed in order from the one with the highest frequency of reception
(5) Predetermined number of channels listed in order from the one with the highest assign rate in all communities (channels that are broadcast nationally, rather than channels having regionality)

While the priorities of (1) to (5) above are arbitrary, in the case when not so much time has elapsed (the elapsed time is within a predetermined range) since the immediately previous scan in (1) above, channels corresponding to (1) above are listed up at the top level of the priorities.

On the basis of the created initial search list, the channel selection section 52 determines success/failure of reception of channels listed up in the initial search list. On the basis of the broadcast signal of each of channels that has been successfully received among the channels listed up in the initial search list, the community specifying section 52 identifies a community to which a station that has transmitted the broadcast signal of that channel belongs, and specifies the identified community as the community to which the current location is considered to belong.

[Description of Operation According to Second Configuration Example of Control Section 11]

Figure 11:
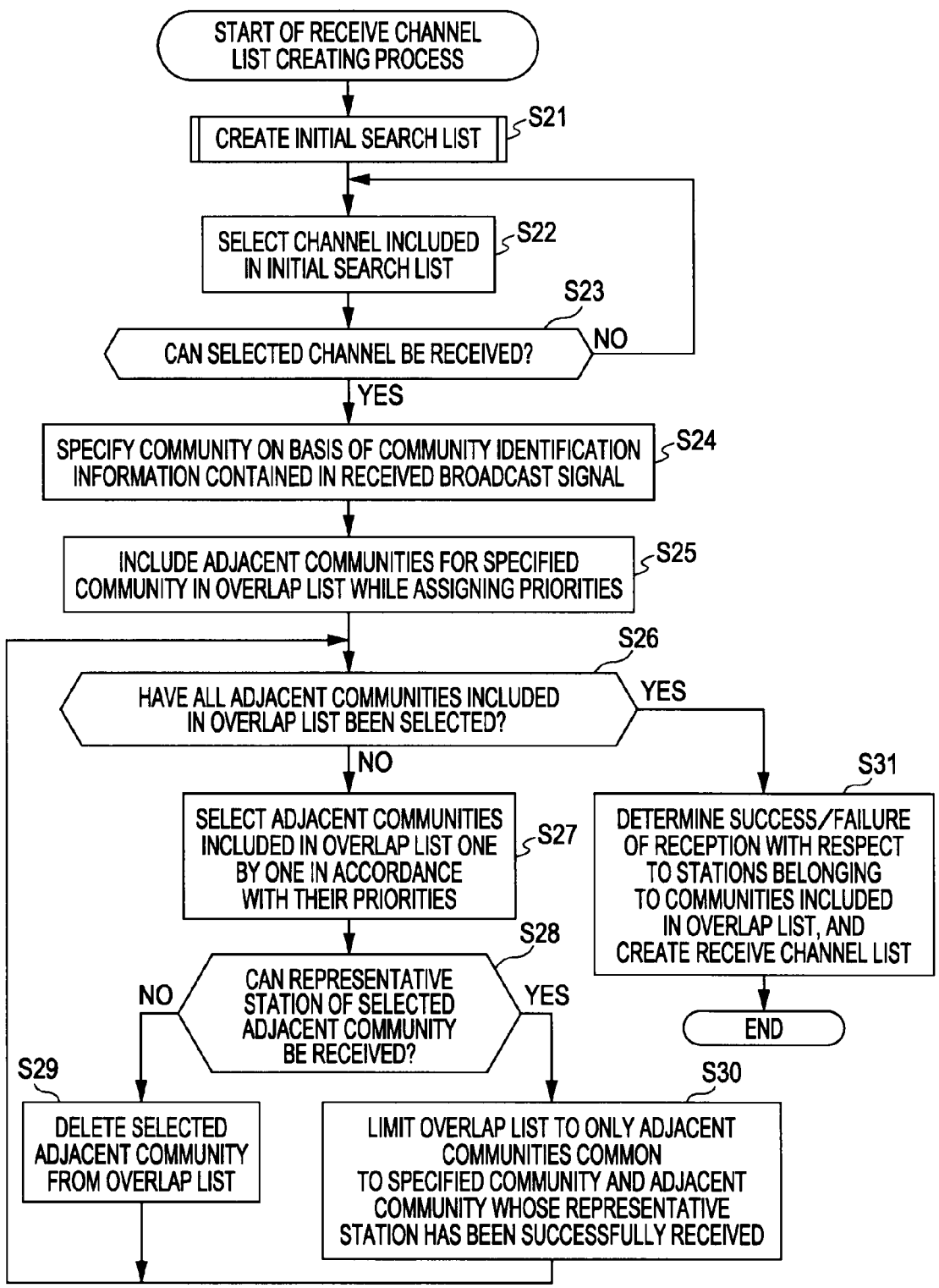
FIG. 11 is a flowchart illustrating a receive channel list creating process according to the second configuration example of the control section.

FIG. 11 is a flowchart illustrating a receive channel list creating process according to the second configuration example of the control section 11.

This receive channel list creating process is started in accordance with, for example, a start instruction from a user who thinks that he/she has moved the position of use (reception) of the portable television receiver 10 to such an extent that the community to which the current location belongs is changed. Alternatively, for example, a function of detecting the current location on the basis of a GPS signal may be provided so that the receive channel list creating process is started upon detecting that the position of use (reception) of the portable television receiver 10 has been moved to such an extent that the community to which the current location belongs is changed.

In step S21, the initial search list creating section 61 creates an initial search list.

Figure 12:
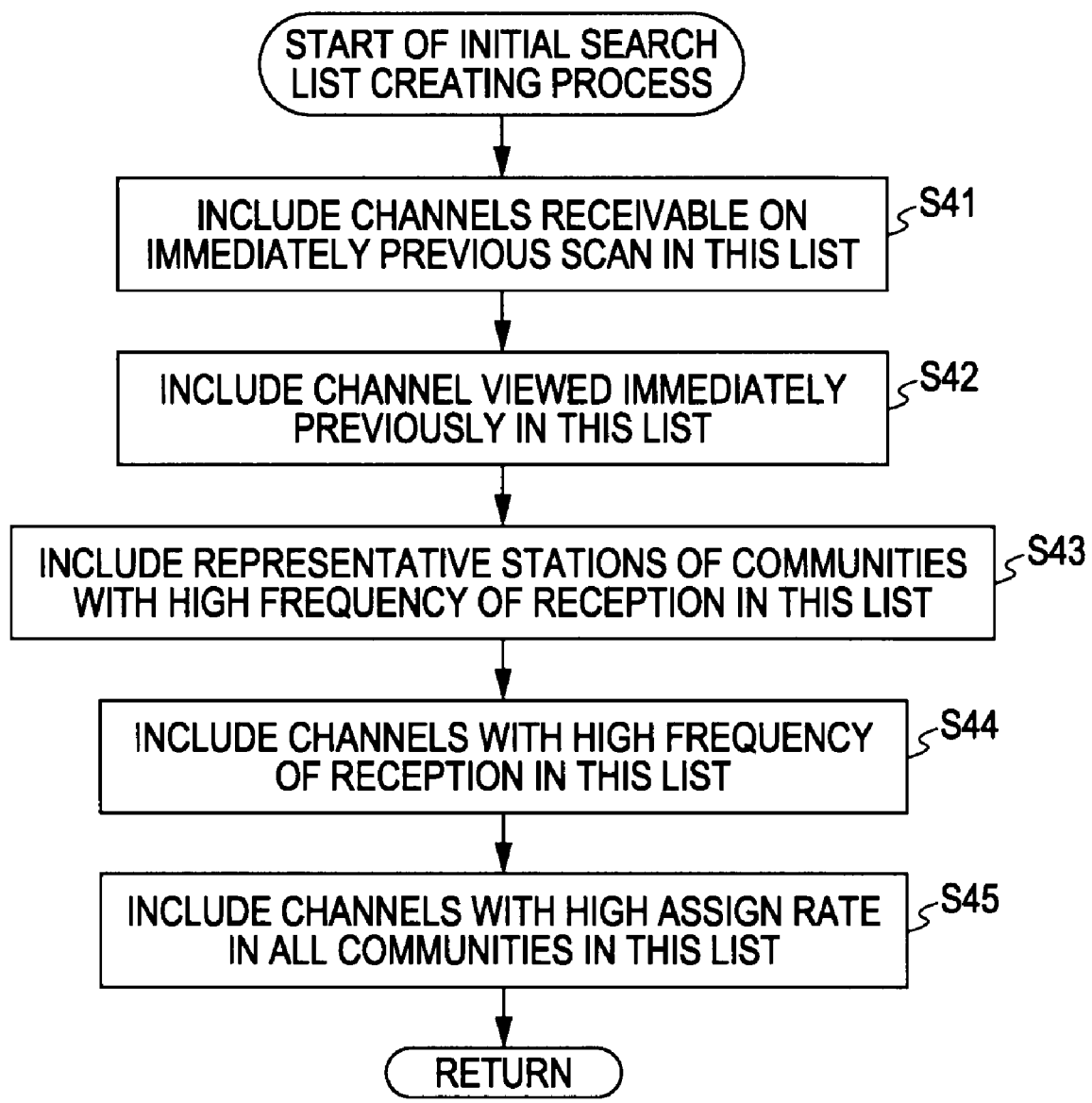
FIG. 12 is a flowchart illustrating a process in step S21 in FIG. 11.

FIG. 12 is a flowchart illustrating the details of a process for creating an initial search list.

In step S41, the initial search list creating section 61 lists up, in an initial search list, channels that were receivable on the immediately previous scan. In step S42, the initial search list creating section 61 lists up, in the initial search list, a channel that was viewed (received) immediately previously. In step S43, the initial search list creating section 61 lists up, in the initial search list, a predetermined number of channels of representative stations of communities in order from the one with the highest frequency of reception in the past. In step S44, the initial search list creating section 61 lists up, in the initial search list, a predetermined number of channels in order from the one with the highest frequency of reception in the past. In step S45, the initial search list creating section 61 lists up, in the initial search list, a predetermined number of channels in order from the one with the highest assign rate in all communities.

The order of execution of steps S41 to S45 is not limited to that described above. Also, the priorities of individual channels when listing up the channels are arbitrary. It should be noted, however, that in the case when not so much time has elapsed (the elapsed time is within a predetermined range) since the immediately previous scan, channels that were receivable on the previous scan are listed up at the top level of the priorities.

Now, the processing returns to FIG. 11. In step S22, the channel selection section 52 selects each single channel listed up in the created initial search list, in order from the one with the highest priority, and controls the receiving section 15 to select the selected channel. In accordance with this control, the receiving section 15 determines success/failure of reception of the channel that the receiving section 15 is controlled to select by the channel selection section 52, and notifies the channel selection section 52 in the control section 11 of reception success/failure information indicating the determination result.

In step S23, on the basis of the reception success/failure information from the receiving section 15, the channel selection section 52 determines whether or not the selected channel has been successfully received, and until it is determined that the selected channel has been successfully received, returns to step S22 to repeat the processes in steps S22 and S23. If it is determined in step S23 that the selected channel has been successfully received, the processing is advanced to step S24.

It should be noted, however, that if all the channels listed up in the initial search list have not been successfully received, as in step S1 in FIG. 9 described above, the user is made to select a community corresponding to the current location and specify the selected community, so step S24 described below is omitted.

In step S24, the channel selection section 52 notifies the community specifying section 51 of each channel that has been selected and successfully received. The community specifying section 51 specifies a community corresponding to community identification information contained in the broadcast signal of the channel notified from the channel selection section 52, as a community in which the current location is considered to be included.

In step S25, in accordance with control of the channel selection section 52, the overlap list creating section 53 refers to the adjacent community list 22 held in the memory 13, and lists up adjacent communities each having an overlapping area with the specified community while assigning priorities in order of size of the overlapping area, thereby creating an overlap list. In this overlap list, the specified community is also included at the top level of the priorities.

In step S26, the channel selection section 52 determines whether or not all the adjacent communities included in the created overlap list have been selected, and if unselected adjacent communities remain, advances the processing to step S27.

In step S27, the channel selection section 52 selects, from among the adjacent communities included in the created overlap list, unselected adjacent communities one by one in accordance with their priorities. It should be noted, however, that since the community at the top level of the overlap list is the one selected in step S24, this community is regarded as having been already selected, and the community with the second highest priority and onwards are selected.

In step S28, the channel selection section 52 determines whether or not a representative station of each of the adjacent communities selected in step S27 can be received. Specifically, the channel selection section 52 controls the receiving section 15 to select a representative station from among the channels of stations belonging to the selected adjacent community, by referring to the broadcast channel list 21 that is held in the memory 13. In accordance with this control, the receiving section 15 determines success/failure of reception of the channel that the receiving section 15 is controlled to select by the channel selection section 52, and notifies the channel selection section 52 in the control section 11 of reception success/failure information indicating the determination result. Further, the channel selection section 52 determines whether or not the representative station of the selected adjacent community has been successfully received, on the basis of the reception success/failure information from the receiving section 15.

It should be noted, however, that when selecting a representative station as described above, for those channels which have already been selected in step S22 and of which success/failure of reception has been determined, selection thereof is omitted, and the determination result in step S23 is exploited. This makes it possible to prevent reception success/failure determination from being made a plurality of times with respect to the same channel.

If it is determined in step S28 that the representative station of the selected adjacent community has not been successfully received, the processing is advanced to step S30. In step S30, in accordance with control from the channel selection section 52, the overlap list creating section 53 removes from the overlap list the adjacent community whose representative station has not been successfully received. Thereafter, the processing returns to step S26, and the subsequent processing is repeated.

Conversely, if it is determined in step S28 that the representative station of the selected adjacent community has been successfully received, the processing is advanced to step S30. In step S30, in accordance with control from the channel selection section 52, the overlap list creating section 53 refers to the adjacent community list 22 held in the memory 13, and leaves, among adjacent communities included in the overlap list, only those adjacent communities which are also adjacent communities for the adjacent community whose representative station has been successfully received, and removes the others from the overlap list. Thereafter, the processing returns to step S26, and the subsequent processing is repeated.

Thereafter, if it is determined in step S26 that no unselected adjacent community remains among the adjacent communities included in the created overlap list, the processing is advanced to step S31.

In step S31, the channel selection section 52 determines whether or not stations other than the representative stations of communities included in the current overlap list (that is, communities whose representative stations have been successfully received) can be received.

Specifically, the channel selection section 52 controls the receiving section 15 to sequentially select the channels of stations belonging to each of the communities included in the current overlap list, by referring to the broadcast channel list 21 that is held in the memory 13. In accordance with this control, the receiving section 15 determines success/failure of reception of each channel that the receiving section 15 is controlled to select by the channel selection section 52, and notifies the channel selection section 52 in the control section 11 of reception success/failure information indicating the determination result. Further, on the basis of the reception success/failure information from the receiving section 15, the channel selection section 52 notifies the receive channel list creating section 54 of stations that have been successfully received and the corresponding channels.

It should be noted, however, that when determining success/failure of reception at this time, for those channels which have already been selected in step S22 and of which success/failure of reception has been determined, selection thereof is omitted, and the determination result in step S23 is exploited. This makes it possible to prevent reception success/failure determination from being made a plurality of times with respect to the same channel.

In response to the notification from the channel selection section 52, the receive channel list creating section 54 creates the receive channel list 23 that is a list of receivable channels at the current location, and causes the receive channel list 23 to be held in the memory 13. The above completes the receive channel list creating process.

Now, the receive channel list creating process will be described by way of specific examples. In the following, it is assumed that the portable television receiver 10 is used in the overlapping area of the communities C1, C2, and C3 in FIG. 4.

Suppose that, for example, the community C2 is specified as a community to which the current location belongs (step S1 in FIG. 9, or step S24 in FIG. 11). In accordance with this, the community C2 and its adjacent communities, C1, C5, C3, and C10 are listed up in the overlap list (step S4 in FIG. 9, or step S25 in FIG. 11).

From the overlap list, first, the adjacent community C1 is selected, and it is determined that CH8 of the station ST1, which is the representative station of the community C1, is receivable (steps S6 and S7 in FIG. 9, or steps S27 and S28 in FIG. 11). Then, among the community C2 and its adjacent communities C1, C5, C3, and C10 which are listed up in the overlap list, the communities C5 and C3 that are also adjacent communities for the community C1 are left, and the community C10 is deleted from the overlap list (step S9 in FIG. 9, or step S30 in FIG. 11). Therefore, the communities C2, C1, C5, and C3 are listed up in the current overlap list.

Again, the adjacent community C5 is selected from the overlap list, and it is determined that CH16 of the station ST13, which is the representative station of the community C5, is unreceivable (step S7 in FIG. 9, or step S28 in FIG. 11). Then, the community C5 is deleted from the overlap list (step S8 in FIG. 9, or step S29 in FIG. 11). Therefore, the communities C2, C1, and C3 are listed up in the current overlap list.

Further, the adjacent community C3 is selected from the overlap list, and it is determined that CH33 of the station ST9, which is the representative station of the community C3, is receivable (step S7 in FIG. 9, or step S28 in FIG. 11). Then, among the communities C2, C1, and C3 that are listed up in the overlap list, the communities C2 and C1 that are also adjacent communities for the community C3 are left (step S9 in FIG. 9, or step S30 in FIG. 11). Therefore, the communities C2, C1, and C3 are listed up in the current overlap list.

Since all the communities listed up in the current overlap list have been already selected, success/failure of reception of stations other than the representative stations of the communities C2, C1, and C3 that are listed up in the current overlap list is determined, and the receive channel list 23 is created on the basis of this determination result.

As described above, according to the receive channel list creating process, since the number of channels for which success/failure of reception is to be determined is less than that in the case of executing an all-channel scan, the receive channel list 23 can be created quickly.

The present invention can be applied not only to a television receiver but also to a receiving apparatus that receives a broadcast signal that is broadcast using a plurality of channels.

The series of processes described above can be either executed by hardware or executed by software. If the series of processes is to be executed by software, a program constituting the software is installed into a computer embedded in dedicated hardware, or into, for example, a computer that can execute various functions when installed with various programs, from a program-recording medium.

The program executed by the computer may be a program in which processes are performed in time series in the order described in this specification, or may be a program in which processes are performed in parallel or at necessary timing, such as when invoked.

Also, the program may be processed by a single computer, or may be processed in a distributed manner across a plurality of computers. Further, the program may be transferred to a remote computer to be executed.

The present application contains subject matter related to that disclosed in Japanese Priority Patent Application JP 2008-322452 filed in the Japan Patent Office on Dec. 18, 2008, the entire content of which is hereby incorporated by reference.

The embodiments of the present invention are not limited to the above-described embodiments but various modifications are possible without departing from the scope of the present invention.

What is claimed is:

1. A receiving apparatus comprising:
   receiving means for receiving a broadcast signal of a selected channel;
   holding means for holding a broadcast channel list and an adjacent community list for each of communities indicating a range in which the broadcast signal of each of one or more channels is receivable, the broadcast channel list recording information indicating the one or more channels that are broadcast in each of the communities and a representative channel of the one or more channels, the adjacent community list indicating adjacent communities adjacent to each of the communities with an overlapping area;
   specifying means for specifying each of the communities;
   overlap list creating means for creating an overlap list that lists up each of the communities which is specified, and adjacent communities adjacent to each of the specified communities;
   channel selection means for selecting a channel to be received by the receiving means, and determining success/failure of reception of the broadcast signal of the selected channel; and
   receive channel list creating means for creating a receive channel list indicating receivable channels, on the basis of a determination result of success/failure of reception of the broadcast signal of each of channels broadcast in the communities listed up in the overlap list.

2. The receiving apparatus according to claim 1, wherein the representative channel is a channel with the largest receivable range within each of the communities.

3. The receiving apparatus according to claim 2, wherein the overlap list creating means further deletes, from the overlap list, each of the adjacent communities for which the broadcast signal of the representative channel is not receivable.

4. The receiving apparatus according to claim 2, wherein the adjacent community list describes the adjacent communities in decreasing order of the overlapping area with respect to each of the communities.

5. The receiving apparatus according to claim 2, wherein the specifying means specifies each of the communities in response to a user's selecting operation.

6. The receiving apparatus according to claim 2, further comprising initial search list creating means for creating an initial search list by listing up at least one of: a channel of which the broadcast signal was receivable immediately previously; a channel of which the broadcast signal was received immediately previously; the representative channel of each of the communities with a high frequency of reception in the past; channels with a high frequency of reception in the past; and channels with a high assign rate in all of the communities,
   wherein the specifying means specifies each of the communities corresponding to each of the channels listed up in the initial search list.

7. The receiving apparatus according to claim 6, wherein the specifying means specifies each of the communities on the basis of community identification information contained in the broadcast signal of each of the channels listed up in the initial search list.

8. The receiving apparatus according to claim 2, wherein the overlap list creating means further deletes, from the overlap list, adjacent communities other than adjacent communities that are also adjacent communities for each of the adjacent communities for which the broadcast signal of the representative channel has been successfully received.

9. A receiving method for a receiving apparatus, the receiving apparatus including
   receiving means for receiving a broadcast signal of a selected channel, and
   holding means for holding a broadcast channel list and an adjacent community list for each of communities indicating a range in which the broadcast signal of each of one or more channels is receivable, the broadcast channel list recording information indicating the one or more channels that are broadcast in each of the communities and a representative channel of the one or more channels, the adjacent community list indicating adjacent communities adjacent to each of the communities with an overlapping area, the receiving method comprising the steps of the receiving apparatus:
   specifying each of the communities;
   creating an overlap list that lists up each of the communities which is specified, and adjacent communities adjacent to each of the specified communities;
   selecting a channel to be received by the receiving means, and determining success/failure of reception of the broadcast signal of the selected channel; and
   creating a receive channel list indicating receivable channels, on the basis of a determination result of success/failure of reception of the broadcast signal of each of channels broadcast in the communities listed up in the overlap list.

10. A non-transitory computer program product having computer readable instructions stored thereon that when executed by a processing circuit in a receiving apparatus cause the receiving apparatus to imprement a method, the receiving apparatus including
   a receiver that receives a broadcast signal of a selected channel, and
   a storage device that stores a broadcast channel list and an adjacent community list for each of communities indicating a range in which the broadcast signal of each of one or more channels is receivable, the broadcast channel list recording information indicating the one or more channels that are broadcast in each of the communities and a representative channel of the one or more channels, the adjacent community list indicating adjacent communities adjacent to each of the communities with an overlapping area, the method comprising:
   specifying each of the communities;
   creating with the processing circuit an overlap list that lists up each of the communities which is specified, and adjacent communities adjacent to each of the specified communities;
   selecting a channel to be received by the receiving means, and determining success/failure of reception of the broadcast signal of the selected channel; and
   creating a receive channel list indicating receivable channels, on the basis of a determination result of success/failure of reception of the broadcast signal of each of channels broadcast in the communities listed up in the overlap list.

11. A receiving apparatus comprising:
   a receiving section receiving a broadcast signal of a selected channel;
   a holding section holding a broadcast channel list and an adjacent community list for each of communities indicating a range in which the broadcast signal of each of one or more channels is receivable, the broadcast channel list recording information indicating the one or more channels that are broadcast in each of the communities and a representative channel of the one or more channels, the adjacent community list indicating adjacent communities adjacent to each of the communities with an overlapping area;
   a specifying section specifying each of the communities;
   an overlap list creating section creating an overlap list that lists up each of the communities which is specified, and adjacent communities adjacent to each of the specified communities;
   a channel selection section selecting a channel to be received by the receiving section, and determining success/failure of reception of the broadcast signal of the selected channel; and
   a receive channel list creating section creating a receive channel list indicating receivable channels, on the basis of a determination result of success/failure of reception of the broadcast signal of each of channels broadcast in the communities listed up in the overlap list.

* * * * *